United States Patent
Nunberg et al.

(10) Patent No.: US 6,505,150 B2
(45) Date of Patent: Jan. 7, 2003

(54) ARTICLE AND METHOD OF AUTOMATICALLY FILTERING INFORMATION RETRIEVAL RESULTS USING TEST GENRE

(75) Inventors: Geoffrey D. Nunberg, San Francisco, CA (US); Hinrich Schuetze, San Francisco, CA (US); Jan O. Pedersen, Fremont, CA (US); Brett L. Kessler, Menlo Park, CA (US)

(73) Assignee: Xerox Corporation, Stamford, CT (US)

( * ) Notice: Subject to any disclaimer, the term of this patent is extended or adjusted under 35 U.S.C. 154(b) by 105 days.

(21) Appl. No.: 09/100,201

(22) Filed: Jun. 18, 1998

(65) Prior Publication Data

US 2002/0002450 A1 Jan. 3, 2002

Related U.S. Application Data

(60) Provisional application No. 60/051,558, filed on Jul. 2, 1997.

(51) Int. Cl.[7] .......................... G10L 17/20; G10L 17/27
(52) U.S. Cl. ................. 704/1; 704/9; 707/531
(58) Field of Search ............................. 704/1, 8, 9, 10; 707/2, 3, 4, 5, 6, 7, 104, 531, 532, 533, 536

(56) References Cited

U.S. PATENT DOCUMENTS

| | | | | |
|---|---|---|---|---|
| 4,773,009 A | * | 9/1988 | Kucera et al. | 707/531 |
| 4,930,077 A | * | 5/1990 | Fan | 704/8 |
| 5,111,398 A | * | 5/1992 | Nunberg et al. | 704/9 |
| 5,159,552 A | * | 10/1992 | Van Gasteren et al. | 704/1 |
| 5,424,945 A | * | 6/1995 | Bell | 705/1 |
| 5,708,825 A | * | 1/1998 | Sotomayor | 707/501 |
| 5,873,056 A | * | 2/1999 | Liddy et al. | 707/9 |
| 5,913,185 A | * | 6/1999 | Martino et al. | 704/8 |
| 5,963,940 A | * | 10/1999 | Liddy et al. | 707/5 |
| 5,999,664 A | * | 12/1999 | Mahoney et al. | 382/305 |
| 6,023,670 A | * | 2/2000 | Martino et al. | 704/8 |

FOREIGN PATENT DOCUMENTS

| | | | | |
|---|---|---|---|---|
| EP | 0889417 A | * | 7/1999 | |
| JP | 11-120206 A | * | 4/1999 | |

OTHER PUBLICATIONS

Douglas Biber: "The Multi–dimensional Approach to Linguistic Analyses of Genre Variation: An Overview of Methodology and Findings", Computers and the Humanities, vol. 26, pp. 331–345, 1993.*

Biber, Douglas and Edward Finegan. "Drift and the Evolution of English Style: A History of Three Genres," Language, vol. 65, No. 3, Sep. 1989, pp.487–517.

Biber, Douglas, "the Multi–Dimensional Approach to Linguistic Analyses of Genre Variation: An Overview of Methodology and Findings," Computers and the Humanities, vol. 26, 1993, pp. 331–345.

(List continued on next page.)

Primary Examiner—Patrick N. Edouard
(74) Attorney, Agent, or Firm—Oliff & Berridge, PLC

(57) ABSTRACT

A method of filtering according to text genre the results of a topic search of a heterogeneous corpus of untagged, machine-readable texts. Because each text of the corpus has a topic and a text genre, the corpus includes multiple text genres and covers multiple topics. According to the method, a processor first searches the corpus for a first multiplicity of texts that have a first topic. Next, the processor identifies a first set of texts of the first multiplicity that are instances of a first text genre and identifies a second set of texts of the first multiplicity that are instances of a second text genre. Finally, the processor identifies to a computer user the first multiplicity of texts in an order based upon the first text genre and second text genre.

22 Claims, 6 Drawing Sheets

OTHER PUBLICATIONS

Biber, Douglas. "Spoken and Written Textual Dimensions in English: Resolving the Contradictory Findings," Language, vol. 62, No. 2, Jun. 1986, pp. 384–414.

Biber, Douglas. "Using Register–Diversified Corpora for General Language Studies," Using Large Corpora, pp. 179–201, Susan Armstrong. Ed., Cambridge, MIT Press, 1994.

Biber, Douglas. Variation Across Speech and Writing, pp. vii, ix, xi, 99 and 101–207, Cambridge, Cambridge University Press, 1988.

Karlgren, Jussi and Douglas Cutting. "Recognizing Text Genres with Simple Metrics Using Discriminant Analysis," *Proceedings of Coling'94*, vol. III, pp.1–6, Aug. 1994.

Kempe, Andre and Lauri Karttunen. "Parallel Replacement in Finite State Calculus," *Proceedings of the Sixteenth International Conference on Computational Linguistics*, Coling 96, Copenhagen, Denmark.

Nunberg, Geoffrey. The Linguistics of Punctuation: An Exercise in the Linguistics of Written Language, The University of Chicago Press, 1990.

Nunberg, Geoffrey and Patrizia Violi. "Text, Form and Genre," *Proceedings of OED'92*, pp.118–122 (pp. 1–6 online version), Oct. 1992.

Saund, Eric. "Multiple Cause Mixture Model for Unsupervised Learning," Neural Computation, vol. 7, pp. 51–71. 1994.

Saund, Eric "Universal Learning of Mixtures of Multiple Causes in Binary Data," *Proceedings of Nips'93*, 1993, pp. 27–31.

\* cited by examiner

Table 1

| Cue Type | Facet Type | | | | | | Brow | |
|---|---|---|---|---|---|---|---|---|
| | Press Report | Editorial Opinion | Legal | Science & Technical | Fiction | Popular | Middle | High |
| Mean (Chars/words)/per article | 4.94 | 4.85 | | 4.81 | 4.25 | 4.63 | 4.80 | 4.93 |
| Mean commas/article | 110.7 | 119.6 | | 78.11 | 120.20 | 109.00 | 118.9 | 102.00 |
| Mean (commas/sentences)/article | 1.22 | 1.21 | | 0.87 | 0.90 | 1.2 | 1.36 | 1.43 |
| Mean (dashes/sentences)/article | 0.09 | 0.1 | | 0.03 | 0.05 | 0.14 | 0.09 | |
| Mean question marks | 0.6 | 5 | | 0.22 | 8.50 | 0.83 | 2.90 | 1.75 |
| Mean (questions/sentences)/article | 0.1 | | | 0.0 | 0.06 | 0.01 | 0.04 | 0.02 |
| Mean dashes/article | 7.9 | 9.60 | 4.78 | 2.67 | 6.60 | 13.33 | 8.10 | 5.50 |
| Mean semicolons/article | 1.2 | 3.2 | | | 4.80 | 3.67 | 5.60 | 7.75 |
| Mean (semicolons/sentences)/article | 0.01 | 0.03 | 0.05 | | 0.04 | 0.04 | 0.06 | 0.11 |
| Sentences starting w/"and", "but", and "so" per article | 3.5 | 7.7 | | 1.0 | 6.7 | 6.7 | 9.1 | 4.0 |
| Sentence starting w/ adverb + comma /article | 1.7 | 2.9 | | 5.3 | 2.8 | 2.3 | 2.6 | 3.2 |

FIG.2

ARTICLE AND METHOD OF AUTOMATICALLY FILTERING INFORMATION RETRIEVAL RESULTS USING TEST GENRE

This application claims the benefit of Provisional application Ser. No. 60/051/558, filed Jul. 2, 1997.

FIELD OF THE INVENTION

The present invention relates to computational linguistics. In particular, the present invention relates to a method of automatically filtering searches of large, untagged, heterogeneous collections of machine-readable texts using text genre.

BACKGROUND OF THE INVENTION

The word "genre" usually functions as a literary substitute for "kind of text." Text genre differs from the related concepts of text topic and document genre. Text genre and text topic are not wholly independent. Distinct text genres like newspaper stories, novels and scientific articles tend to largely deal with different ranges of topics; however, topical commonalties within each of these text genres are very broad and abstract. Additionally, any extensive collection of texts relating to a single topic almost always includes works of more than one text genre so that the formal similarities between them are limited to the presence of lexical items. While text genre as a concept is independent of document genre, the two genre types grow up in close historical association with dense functional interdependencies. For example, a single text genre may be associated with several document genres. A short story may appear in a magazine or anthology or a novel can be published serially in parts, reissued as a hard cover and later as a paper back. Similarly, a document genre like a newspaper may contain several text genres, like features, columns, advice-to-the-lovelorn, and crossword puzzles. These text genres might not read as they do if they did not appear in a newspaper, which licenses the use of context dependent words like "yesterday" and "local". By virtue of their close association, material features of document genres often signal text genre. For example, a newspaper may use one font for the headlines of "hard news" and another in the headlines of analysis; a periodical may signal its topical content via paper stock; business and personal letters can be distinguished based upon page lay out; and so on. It is because digitization eliminates these material clues as to text and document genres that it is often difficult to retrieve relevant texts from heterogeneous digital text collections.

The boundaries between textual genres mirror the divisions of social life into distinct roles and activities—between public and private, generalist and specialist, work and recreation, etc. Genres provide the context that makes documents interpretable, and for this reason genre, no less than content, shapes the user's conception of relevance. For example, a researcher seeking information about supercolliders or Napoleon will care as much about text genre as content—she will want to know not just what the source says, but whether that source appears in a scholarly journal or in a popular magazine.

Until recently work on information retrieval and text classification has focused almost exclusively on the identification of topic, rather than on text genre. Two reasons explain this neglect. First, the traditional print-based document world did not perceive a need for genre classification because in this world genres are clearly marked, either intrinsically or by institutional and contextual features. A scientist looking in a library for an article about cold fusion need not worry about how to restrict his search to journal articles, which are catalogued and shelved so as to keep them distinct from popular science magazines. Second, early information retrieval work with on-line text databases focused on small, relatively homogeneous databases in which text genre was externally controlled, like encyclopedia or newspaper databases. The creation of large, heterogeneous, text databases, in which the lines between text genres are often unmarked, highlights the importance of genre classification of texts. Topic-based search tools alone cannot adequately winnow the domain of a reader's interest when searching a large heterogeneous database.

Applications of genre classification are not limited to the field of information retrieval. Several linguistic technologies could also profit from its application. Both automatic part of sentence taggers and sense taggers could benefit from genre classification because it is well known that the distribution of word senses varies enormously according to genre.

Discussions of literary classification stretch back to Aristotle. The literature on genre is rich with classificatory schemes and systems, some of which might be analyzed as simple attribute systems. These discussions tend to be vague and to focus exclusively on literary forms like the eclogue or the novel, and, to a lesser extent, on paraliterary forms like the newspaper crime report or the love letter. Classification discussions tend to ignore unliterary textual types such as annual reports, Email communications, and scientific abstracts. Moreover, none of these discussions make an effort to tie the abstract dimensions along which genres are distinguished to any formal features of the texts.

The only linguistic research specifically concerned with quantificational methods of genre classification of texts is that of Douglas Biber. His work includes: *Spoken and Written Textual Dimensions in English: Resolving the Contradictory Findings*, Language, 62(2):384–413, 1986; *Variation Across Speech and Writing*, Cambridge University Press, 1988; *The Multidimensional Approach to Linguistic Analyses of Genre Variation: An Overview of Methodology and Finding*, Computers in the Humanities, 26(5–6):331–347, 1992; *Using Register-Diversified Corpora for General Language Studies*, in Using Large Corpora, pp. 179–202 (Susan Armstrong ed.) (1994); and with Edward Finegan, *Drift and the Evolution of English Style: A History of Three Genres*, Language, 65(1):93–124, 1989. Biber's work is descriptive, aimed at differentiating text genres functionally according to the types of linguistic features that each tends to exploit. He begins with a corpus that has been hand-divided into a number of distinct genres, such as "academic prose" and "general fiction." He then ranks these genres along several textual "dimensions" or factors, typically three or five. Biber individuates his factors by applying factor analysis to a set of linguistic features, most of them syntactic or lexical. These factors include, for example, past-tense verbs, past participial clauses and "wh-" questions. He then assigns to his factors general meanings or functions by abstracting over the discourse functions that linguists have applied assigned to the individual components of each factor; e.g., as an "informative vs. involved" dimension, a "narrative vs. non-narrative" dimension, and so on. Note that these factors are not individuated according to their usefulness in classifying individual texts according to genre. A score that any text receives on a given factor or set of factors may not be greatly informative as its genre because there is considerable overlap between genres with regard to any individual factor.

Jussi Karlgren and Douglass Cutting describe their effort to apply some of Biber's results to automatic categorization of genre in *Recognizing Text Genres with Simple Metric Using Discriminant Analysis*, in *Proceedings of Coling '94, Volume II*, pp. 1071–1075, August 1994. They too begin with a corpus of hand-classified texts, the Brown corpus. The people who organized the Brown corpus describe their classifications as generic, but the fit between the texts and the genres a sophisticated reader would recognize is only approximate. Karigren and Cutting use either lexical or distributional features—the lexical features include first-person pronoun count and present-tense verb count, while the distributional features include long-word count and character per word average. They do not use punctuational or character level features. Using discriminant analysis, the authors classify the texts into various numbers of categories. When Karigren and Cutting used a number of functions equal to the number of categories assigned by hand, the fit between the automatically derived and hand-classified categories is 51.6%. They improved performance by reducing the number of functions and reconfiguring the categories of the corpus. Karigren and Cutting observe that it is not clear that such methods will be useful for information retrieval purposes, stating: "The problem with using automatically derived categories is that even if they are in a sense real, meaning that they are supported by the data, they may be difficult to explain for the unenthusiastic layman if the aim is to use the technique in retrieval tools." Additionally, it is not clear to what extent the idiosyncratic "genres" of the Brown corpus coincide with the categories that users find relevant for information retrieval tasks.

Geoffrey Nunberg and Patrizia Violi suggest that genre recognition will be important for information retrieval and natural language processing tasks in *Text, Form and Genre* in *Proceedings of OED '92*, pp. 118–122, October 1992. These authors propose that text genre can be treated in terms of attributes, rather than classes; however, they offer no concrete proposal as to how identification can be accomplished.

SUMMARY OF THE INVENTION

An advantage of the present invention is that it enables automatic filtering of information retrieval results according to text genre at a relatively small computational cost by using untagged texts. The use of cues that are string recognizable eliminates the need for tagged texts. According to the present invention, texts are classified using publicly recognized genre types that are each associated with a characteristic set of principles of interpretation, rather than automatically derived text genres. This increases the utility of genre classifications produced using the present invention in applications directed at the lay public. The utility of the present invention to the lay public is further increased because it can recognize the full range of textual genre types, including unliterary forms such as annual reports, Email communications and scientific abstracts, for example.

The method of the present invention for automatically identifying the text genre of a machine-readable, untagged, text provides these and other advantages. Briefly described, the processor implemented method begins with a computer user indicating a desired topic for each text retrieved. Next, for each of the retrieved texts having the desired topic the processor generates a cue vector that represents occurrences in the text of a first set of nonstructural, surface cues, which are easily computable from the text. Afterward, the processor classifies each retrieved text according to text genre using the text's cue vector and a weighting vector associated with each text genre. The processor then uses the text genres to determine an order of presentation to the computer user of the retrieved texts.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

FIG. 2 illustrates Table I, a table of trial observations of surface cue values according to facet value.

DETAILED DESCRIPTION OF THE PREFERRED EMBODIMENTS

Figure 1:
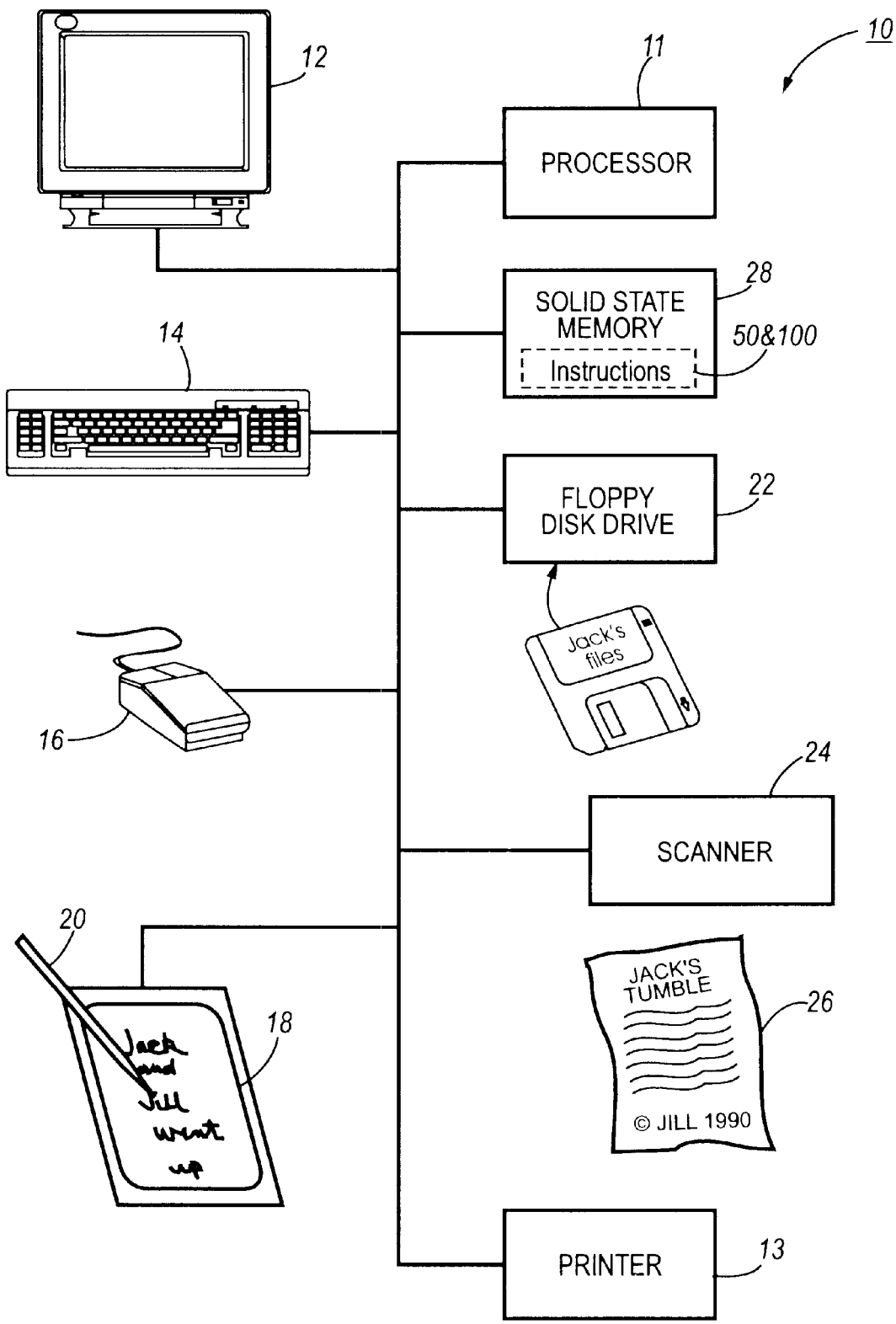
FIG. 1 illustrates a computer system for automatically determining the text genre of machine-readable texts.

FIG. 1 illustrates in block diagram form computer system 10 in which the present method is implemented by executing instructions 200 and 220. The present method alters the operation of computer system 10, allowing it to organize results of searching a large, heterogeneous collection of machine-readable texts according to the type of text genre of the retrieved texts. Computer system 10 automatically determines the text genre of untagged texts presented in machine-readable form without structural analysis of the text, word stemming or part of speech tagging. Instructions 200 and 220 rely upon new surface-level cues, or features, which can be computed from the text more quickly than structurally based features. Briefly described, according to instructions 200 and 220, computer system 10 responds to a search request specifying a topic of interest by identifying those texts dealing with the topic. Computer system 10 then analyzes those texts to generate a cue vector for each document. Computer system 10 then determines whether each text is an instance of a particular text genre and/or has a desired facet value using the cue vector and a weighting vector associated with the particular text genre and/or facet. Instructions 200 and 220 will be described in detail with respect to FIGS. 5 and 6.

A. A Computer System for Automatically Determining Text Genre

Prior to a more detailed discussion of instructions 200 and 220, consider computer system 10, which executes those instructions. Illustrated in FIG. 1, computer system 10 includes monitor 12 for visually displaying information to a computer user. Computer system 10 also outputs information to the computer user via printer 13. Computer system 10 provides the computer user multiple avenues to input data. Keyboard 14 allows the computer user to input data to computer system 10 by typing. By moving mouse 16 the computer user is able to move a pointer displayed on monitor 12. The computer user may also input information to computer system 10 by writing on electronic tablet 18 with a stylus 20 or pen. Alternately, the computer user can input data stored on a magnetic medium, such as a floppy disk, by inserting the disk into floppy disk drive 22. Scanner 24 allows the computer user to generate machine-readable versions, e.g. ASCII, of hard copy documents.

Processor 11 controls and coordinates the operations of computer system 10 to execute the commands of the computer user. Processor 11 determines and takes the appropriate action in response to each user command by executing instructions, which like instructions 50 and 100, are stored electronically in memory, either memory 28 or on a floppy disk within disk drive. Typically, operating instructions for processor 11 are stored in solid state memory, allowing frequent and rapid access to the instructions. Semiconductor logic devices that can be used to realize memory include read only memories (ROM), random access memories (RAM), dynamic random access memories (DRAM), programmable read only memories (PROM), erasable programmable read only memories (EPROM), and electrically erasable programmable read only memories (EEPROM), such as flash memories.

B. Text Genres, Facets and Cues

According to instructions 50 and 100, computer system 10 determines the text genre of a tokenized, machine-readable text that has not been structurally analyzed, stemmed, parsed, nor tagged for sense or parts of speech. As used herein, a "text genre" is any widely recognized class of texts defined by some common communicative purpose or other functional traits, provided that the function is connected to some formal cues or commonalties that are not the direct consequences of the immediate topic that the texts address. Wide recognition of a class of texts enables the public to interpret the texts of the class using a characteristic set of principles of interpretation. As used herein, text genre applies only to sentential genres; that is, applies only to genres that communicate primarily via sentences and sentence like strings that make use of the full repertory of text-category indicators like punctuation marks, paragraphs, and the like. Thus, according to the present invention airline schedules, stock tables and comic strips are not recognized as text genres. Nor does the present invention recognize genres of spoken discourse as text genres. Preferably, the class defined by a text genre should be extensible. Thus, according to the present invention the class of novels written by Jane Austen is not a preferred text genre because the class is not extensible.

The methods of instructions 50 and 100 treat text genres as a bundle of facets, each of which is associated with a characteristic set of computable linguistic properties, called cues or features, which are observable from the formal, surface level, features of texts. Using these cues, each facet distinguishes a class of texts that answer to certain practical interests. Facets tend to identify text genre indirectly because one facet can be relevant to multiple genres. Because any text genre can be defined as a particular cluster of facets the present method allows identification of text genres and supergenres with the same accuracy as other approaches, but with the advantage of easily allowing the addition of new, previously unencountered text genres.

Rather than attempting to further define the concept of facets, consider a number of illustrative examples. The audience facet distinguishes between texts that have been broadcast and those whose distribution was directed to a more limited audience. The length facet distinguishes between short and long texts. Distinctions between texts that were authored by organizations or anonymously and individuals are represented by the author facet. List below are other facets and their values, when those values are not obvious. Note facets need not be binary valued.

| Facet Name | Possible Values | |
|---|---|---|
| 1. Date | | Dated/Undated |
| 2. Narrative | | Yes/No |
| 3. Suasive(Argumentative)/ Descriptive(Informative) | | |
| 4. Fiction/Nonfiction | | |
| 5. Legal | | Yes/No |
| 6. Science & Technical | | Yes/No |
| 7. Brow | Popular | Yes/No |
| | Middle | Yes/No |
| | High | Yes/No |

Other facets can be defined and added to those listed above consistent with the present invention. Not all facets need be used to define a text genre; indeed, a text genre could be defined by a single facet. Listed below are but a few examples of conventionally recognized text genres that can be defined using the facets and values described.

| | | |
|---|---|---|
| 1. | Press Reports | |
| | a. Audience | Broadcast |
| | b. Date | Dated |
| | c. Suasive | Descriptive |
| | d. Narrative | Yes |
| | e. Fiction | No |
| | f. Brow | Popular |
| | g. Author | Unsigned |
| | h. Science & Technical | No |
| | i. Legal | No |
| 2. | Editorial Opinions | |
| | a. Audience | Broadcast |
| | b. Date | Dated |
| | c. Suasive | Yes |
| | d. Narrative | Yes |
| | e. Fiction | No |
| | f. Brow | Popular |
| | g. Authorship | Signed |
| | h. Science & Technical | No |
| | i. Legal | No |
| 3. | Market Analysis | |
| | a. Audience | Broadcast |
| | b. Date | Dated |
| | c. Suasive | Descriptive |
| | d. Narrative | No |
| | e. Fiction | No |
| | f. Brow | High |
| | g. Authorship | Organizational |
| | h. Science and Technical | Yes |
| | i. Legal | No |
| 4. | Email | |
| | a. Audience | Directed |
| | b. Date | Dated |
| | c. Fiction | No |
| | d. Brow | Popular |
| | e. Authorship | Signed |

Just as text genres decompose into a group of facets, so do facets decompose into surface level cues according to the present methods. The surface level cues of the present invention differ from prior features because they can be computed using tokenized ASCII text without doing any structural analysis, such as word stemming, parsing or sense or part of speech tagging. For the most part, it is the frequency of occurrence of these surface level cues within a text that is relevant to the present methods. Several types of surface level or formal cues can be defined, including, but not limited to: numerical/statistical, punctuational, constructional, formulae, lexical and deviation. Formulae type cues are collocations or fixed expressions that are conventionally associated with a particular text genre. For example, fairy tales begin with "Once upon a time" and Marian hymns begin with "Hail Mary." Other formulae announce legal documents, licensing agreements and the like. Lexical type cues are directed to the frequency of certain lexical items that can signal a text genre. For example, the use of formal terms of address like "Mr., Mrs. and Ms." are associated with articles in the New York Times; and the use of words like "yesterday" and "local" frequently occur in newspaper reports. Additionally, the use of a phrase like "it's pretty much a snap" indicate that a text is not part of an encyclopedia article, for example. The use of some lexical items is warranted by the topical and rhetorical commonalties of some text genres. While constructional features are known in the prior art, computation of most of them requires tagged or fully parsed text. Two new surface level constructional cues are defined according to the present invention which are string recognizable. Punctuational type cues are counts of punctuational features within a text. This type of cue has not been used previously; however, they can serve as a useful indicator of text genre because they are at once significant and very frequent. For example, a high question mark count may indicate that a text attempts to persuade its audience. In contrast to most other cue types, which measure the frequency of surface level features within a particular text, deviation type cues relate to deviations in unit size. For example, deviation cues can be used to track variations in sentence and paragraph length, features that may vary according to text genre. Cue types have been described merely to suggest the kinds of surface level features that can be measured to signal text features; characterization of cue type is not important to the present invention. The number of cues that can be defined is theoretically unlimited. Just a few of the possible cues are listed below for illustrative purposes.

A. Punctuational Cues
  1. Log (comma count +1)
  2. Mean (commas/sentences)/article
  3. Mean (dashes/sentences)/article
  4. Log (question mark count +1)
  5. Mean (questions/sentences)/article
  6. Log (dash count +1)
  7. Log (semicolon count +1)
B. String Recognizable Constructional Cues
  1. Sentences starting w/ "and" "but" and "so" per article
  2. Sentences starting w/adverb+comma/article
C. Formulae Cues
  1. "Once upon a time . . . "
D. Lexical Cues (Token counts only are taken unless otherwise indicated)
  1. Abbreviations for "Mr., Mrs." etc.
  2. Acronyms
  3. Modal auxiliaries
  4. Forms of the verb "be"
  5. Calendar—days of the week, months
  6 ,7. Capital—non-sentence initial words that are capitalized Type and Token counts
  8. Number of characters
  9, 10. Contractions Type and Token counts
  11, 12. Words that end in "ed" Type and Token counts
  13. Mathematical Formula
  14. Forms of the verb "have"
  15, 16. Hyphenated words Type and token counts
  17, 18. Polysyllabic words Type and token counts
  19. The word "it"
  20, 21. Latinate prefixes and suffixes Type and token counts
  22, 23. Words more than 6 letters Type and token counts
  24, 25. Words more than 10 letters Type and token counts
  26, 27. Three+word phrases Type and token counts
  28, 29. Polysyllabic words ending in "ly" Type and token counts
  30. Overt negatives
  31, 32. Words containing at least one digit Type and token counts
  33. Left parentheses
  34, 35. Prepositions Type and token counts
  36. First person singular pronouns
  37. First person plural pronouns
  38. Pairs of quotation marks
  39. Roman Numerals
  40. Instances of "that"
  41. Instances of "which"
  42. Second person plural pronouns
E. Deviation Cues
  1. standard deviation of sentence length in words
  2. standard deviation of word length in characters
  3. standard deviation of length of text segments between punctuation marks in words
  4. Mean (characters/words) per article The result of a preliminary trial with a corpus of approximately four hundred texts, Table I of FIG. 2 illustrates how some surface level cues can vary according to facet/text genre. (This trial treated some text genres as a single facet, rather than decomposing the text genres as described above. Both approaches are consistent with the present invention. As stated previously, a text genre may be defined by a single facet.) For example, within this corpus press reports included only 1.2 semicolons per article, while legal documents included 4.78. Similarly, the number of dashes per text differed among press reports, editorial opinions and fiction.

What weight should be given to different cue values? Or, stated another way, how strongly correlative is a cue value, or set of cue values, of a particular facet or text genre? In contrast to the decomposition of text genres into facet values, which is a matter of human judgment, answering this question is not. Determining the weight accorded to each cue according to facet requires training, which is described below with respect to FIG. 3.

C. Training to Determine Cue Weights

Figure 3:
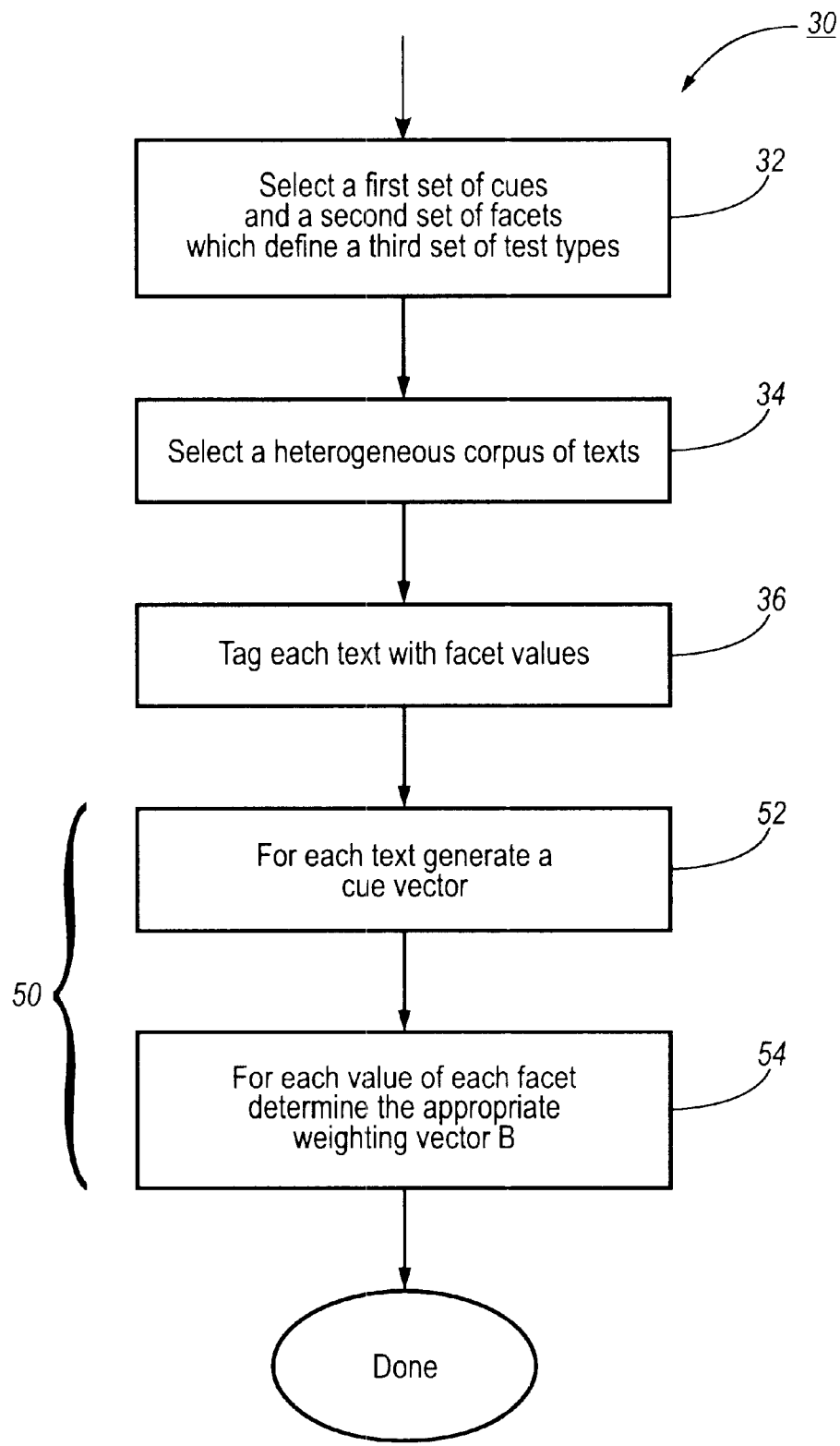
FIG. 3 illustrates in flow diagram form instructions for training to generate weighting vectors values from a training corpus.

FIG. 3 illustrates in flow diagram form training method 30 for determining cue weights for each cue. Training method 30 is not entirely automatic; steps 32, 34 and 36 are manually executed while those of instructions 50 are processor implemented. Instructions 50 may be stored in solid state memory or on a floppy disk placed within floppy disk drive and may be realized in any computer language, including LISP and C++.

Training method 30 begins with the selection of a set of cues and another set of facets, which can be used to define a set of widely recognized text genres. Preferably, about 50 to 55 surface level cues are selected during step 32, although a lesser or greater number can be used consistent with the present invention. Selection of a number of lexical and punctuational type surface level cues is also preferred. The user may incorporate all of the surface level cues into each facet defined, although this is not necessary. While any number of facets can be defined and selected during step 32, the user must define some number of them. In contrast, the user need not define text genres at this point because facets by themselves are useful in a number of applications, as will be discussed below. Afterward, during step 34 the user selects a heterogeneous corpus of texts. Preferably the selected corpus includes about 20 instances of each of the selected text genres or facets, if text genres have not been defined. If not already in digital or machine-readable form, typically ASCII, then the corpus must be converted and tokenized before proceeding to instructions 50. Having selected facets, surface level cues and a heterogeneous corpus, during step 36 the user associates machine-readable facet values with each of the texts of the corpus. Afterward, the user turns the remaining training tasks over to computer system 10.

Instructions 50 begin with step 52, during which processor 11 generates a cue vector, X, for each text of the corpus. The cue vector is a multi-dimensional vector having a value for each of the selected cues. Processor 11 determines the value for each cue based upon the relevant surface level features observed within a particular text. Methods of determining cue values given definitions of the selected cues will be obvious to those of ordinary skill and therefore will not be described in detail herein. Because these methods do not require structural analysis or tagging of the texts, processor 11 expends relatively little computational effort in determining cue values during step 52.

Processor 11 determines the weighting that should be given to each cue according to facet value during step 54. In other words, during step 54 processor 11 generates a weighting vector, β, for each facet. Like the cue vector, X, the weighting vector, β, is a multidimensional vector having a value for each of the selected cues. A number of mathematical approaches can be used to generate weighting vectors from the cue vectors for the corpus, including logistic regression. Using logistic regression, processor 11 divides the cue vectors generated during step 52 into sets of identical cue vectors. Next, for each binary valued facet, processor 11 solves a log odds function for each set of identical cue vectors. The log odds function, g(ϕ), is expressed as:

$$g(\phi) = \log(\phi/1-(\phi)) = X\beta;$$

where:

ϕ is the proportion of vectors for which the facet value is true;

1−ϕ is the proportion of vectors in the set for which the facet value is false.

The processor 11 is able to determine the values of ϕ and 1−ϕ because earlier tagging of facet values indicates the number of texts having each facet value within each set of texts having identical cue vectors. Thus, processor 11 can determine the values of weighting vector β for each binary valued facet by solving the system of simultaneous equations defined by all the sets of identical cue vectors, the known values of ϕ, 1−ϕ and the cue vector values. Logistic regression is well known and will not be described in greater detail here. For a more detailed discussion of logistic regression, see Chapter 4 of McCullagh, P. and Nelder, J. A., *Generalized Linear Models,* 2d Ed., 1989 (Chapman and Hall pub.), incorporated herein by reference.

Processor 11 can use the method just described to generate weighting vectors for facets that are not binary valued, like the Brow facet, by treating each value of the facet as a binary valued facet, as will be obvious to those of ordinary skill. In other words, a weighting vector is generated for each value of a non-binary valued facet.

Using logistic regression with as large a number of cues as preferred, 50-55, may lead to overfitting. Further, logistic regression does not model variable interactions. To allow modeling of variable interactions and avoid overfitting, neural networks can be used with early stopping based on a validation set during step 54 to generate the weighting vectors and may improve performance. However, either approach may be used during step 54 consistent with the present invention.

To enable future automatic identification of text genre, processor 11 stores in memory the weighting vectors for each of the selected facets. That done, training is complete.

D. Automatically Identifying Text Genre and Facets

Figure 4:
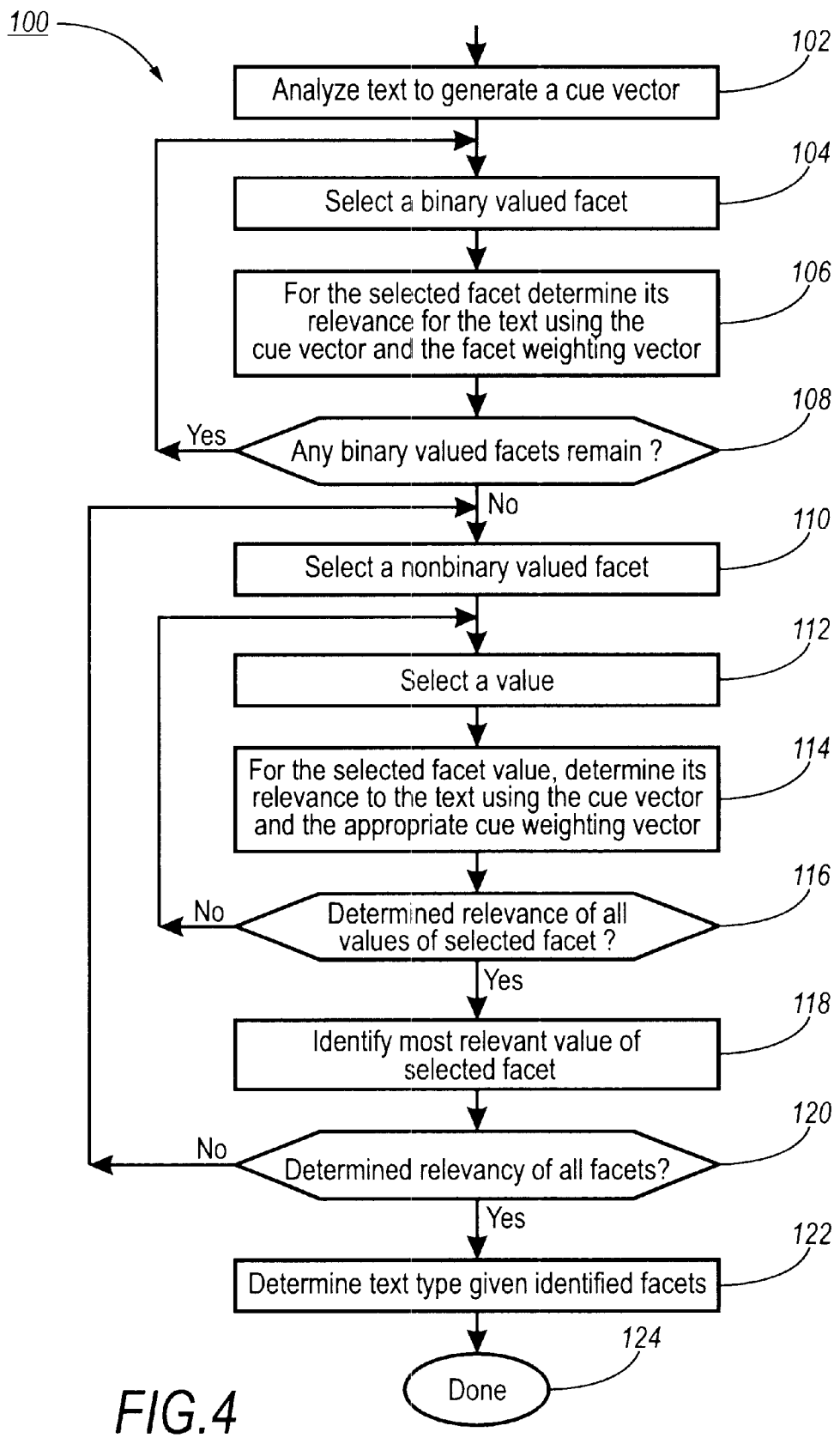
FIG. 4 illustrates in flow diagram form instructions for determining the relevance of text genres and facets to a machine-readable text.

FIG. 4 illustrates in flow diagram form instructions 100. By executing instructions 100, processor 11 automatically identifies the text genre of a machine-readable, untagged, text 11 using set of surface level cues, a set of facets and weighting vectors. Briefly described, according to instructions 100, processor 11 first generates a cue vector for the tokenized, machine-readable text to be classified. Subsequently, processor 11 determines the relevancy of each facet to the text using the cue vector and a weighting vector associated with the facet. After determining the relevancy of each facet to the text, processor 11 identifies the genre or genres of the text. Instructions 100 may be stored in solid state memory or on a floppy disk placed within floppy disk drive and may be realized in any computer language, including LISP and C++.

In response to a user request to identify the genre of a selected tokenized, machine-readable text, processor 11 advances to step 102. During that step, processor 11 generates for the text a cue vector, X, which represents the observed values within the selected text for each of the previously defined surface level cues. As discussed previously, methods of determining cue values given cue definitions will be obvious to those of ordinary skill and need not be discussed in detail here. Processor 11 then advances to step 104 to begin the process of identifying the facets relevant to the selected text.

According to instructions 100, identification of relevant facets begins with the binary valued facets; however, consistent with the present invention identification may also begin with the non-binary valued facets. Evaluation of the binary valued facets begins with processor 11 selecting one during step 104. Processor 11 then retrieves from memory the weight vector, β, associated with the selected facet and combines it with the cue vector, X, generated during step 102. Processor 11 may use a number of mathematical approaches to combine these two vectors to produce an indicator of the relevance of the selected facet to the text being classified, including logistic regression and the log odds function. In contrast to its use during training, during step 106 processor 11 solves the log odds function to find ϕ, which now represents the relevance of the selected facet to the text. Processor 11 regards a facet as relevant to a text if solution of the log odds function produces a value greater than 0, although other values can be chosen as a cut-off for relevancy consistent with the present invention.

Having determined the relevancy of one binary valued facet, processor 11 advances to step 108 to ascertain whether other binary-valued facets require evaluation. If so, processor 11 branches back up to step 104 and continues evaluating the relevancy of facets, one at a time, by executing the loop of steps 104, 106 and 108 until every binary-valued facet has been considered. When that occurs, processor 11 branches from step 108 to step 110 to begin the process of determining the relevancy of the non-binary valued facets.

Processor 11 also executes a loop to determine the relevance of the non-binary valued facets. Treatment of the non-binary valued facets differs from that of binary valued facets in that the relevance of each facet value must be evaluated separately. Thus, after generating a value of the log odds function for each value of the selected facet by repeatedly executing step 114, processor 11 must decide which facet value is most relevant during step 118. Processor 11 regards the highest scoring facet value as the most relevant. After determining the appropriate facet value for each of the non-binary valued facets, processor 11 advances to step 122 from step 120.

During step 122 processor 11 identifies which text genres the selected text represents using the facets determined to be relevant and the text genre definitions in terms of facet values. Methods of doing so are obvious to those of ordinary skill and need not be described in detail herein. Afterward, processor 11 associates with the selected text the text genres and facets determined to be relevant to the selected text. While preferred, determination of text genres during step 122 is optional because, as noted previously, text genres need not be defined because facet classifications are useful by themselves.

E. Applications for Text Genre and Facet Classification

The fields of natural language and information retrieval both present a number of applications for automatic classification of text genre and facets. Within natural language, automatic text classification will be useful with taggers and translation. Within the information retrieval field, text genre classification will be useful as a search filter and parameter, in revising document format and enhancing automatic summarization.

Present sense taggers and part of speech taggers both use raw statistics about the frequency of items within a text. The performance of these taggers can be improved by automatically classifying texts according to their text genres and computing probabilities relevant to the taggers according to text genre. For example, the probability that "sore" will have the sense of "angry" or that "cool" will have the sense of "first-rate" is much greater in a newspaper movie review of a short story than in a critical biography.

Both language translation systems and language generation systems distinguish between synonym sets. The conditions indicating which synonym of a set to select are complex and must be accommodated. Language translation system must recognize both the sense of a word in the original language and then identify an appropriate synonym in the target language. These difficulties cannot be resolved simply by labeling the items in each language and translating systematically between them; e.g., by categorically substituting the same "slang" English word for its "slang" equivalent in French. In one context the French sentence "Il cherche un boulot" might be translated by "He's looking for a gig," in another context by "He's looking for a job." The sentence "Il (re)cherche un travail" might be either "He's looking for a job" or "He's seeking employment," and so on. Making the appropriate choice depends on an analysis of the genre of the text from which a source item derives. Automatic text genre classification can improve the performance of both language translation systems and language generation systems. It can do so because it allows recognition of different text genres and of different registers of a language, and, thus, distinctions between members of many synonym sets. Such synonym sets include: "dismiss/fire/can," "rather/pretty," "want/wish," "buy it/die/decease," "wheels/car/automobile" and "gig/job/position."

Most information retrieval system have been developed using homogeneous databases and they tend to perform poorly on heterogeneous databases. Automatic text genre classification can improve the performance of information retrieval systems with heterogeneous databases by acting as a filter on the output of topic-based searches or as an independent search parameter. For example, a searcher might search for newspaper editorials on a supercollider, but exclude newspaper articles, or search for articles on LANs in general magazines but not technical journals. Analogously, a searcher might start with a particular text and ask the search system to retrieve other texts similar to it as to genre, as well as topic. Information retrieval systems could use genre classification as a way of ranking or clustering the results of a topic based search.

Figure 5:
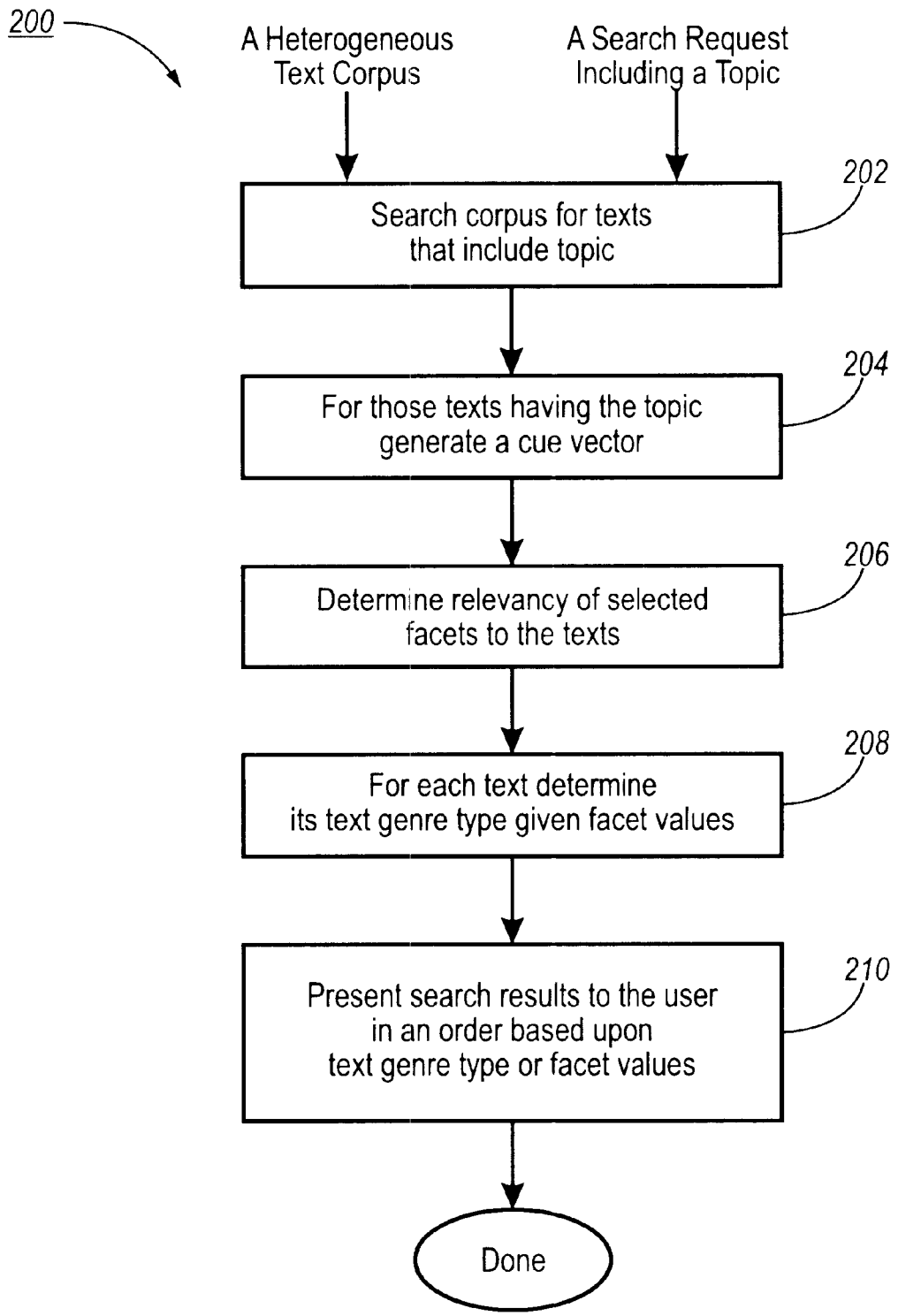
FIG. 5 illustrates in flow diagram form instructions for presenting information retrieval results according to text genre.

FIG. 5 illustrates in flow diagram form instructions 200 for organizing information retrieval results based upon text genres of the texts retrieved. Instructions 200 are stored electronically in memory, either memory 28 or on a floppy disk within disk drive. Instructions 200 need not be discussed in detail herein given the previous discussion of determining text genre type using instructions 100.

Figure 6:
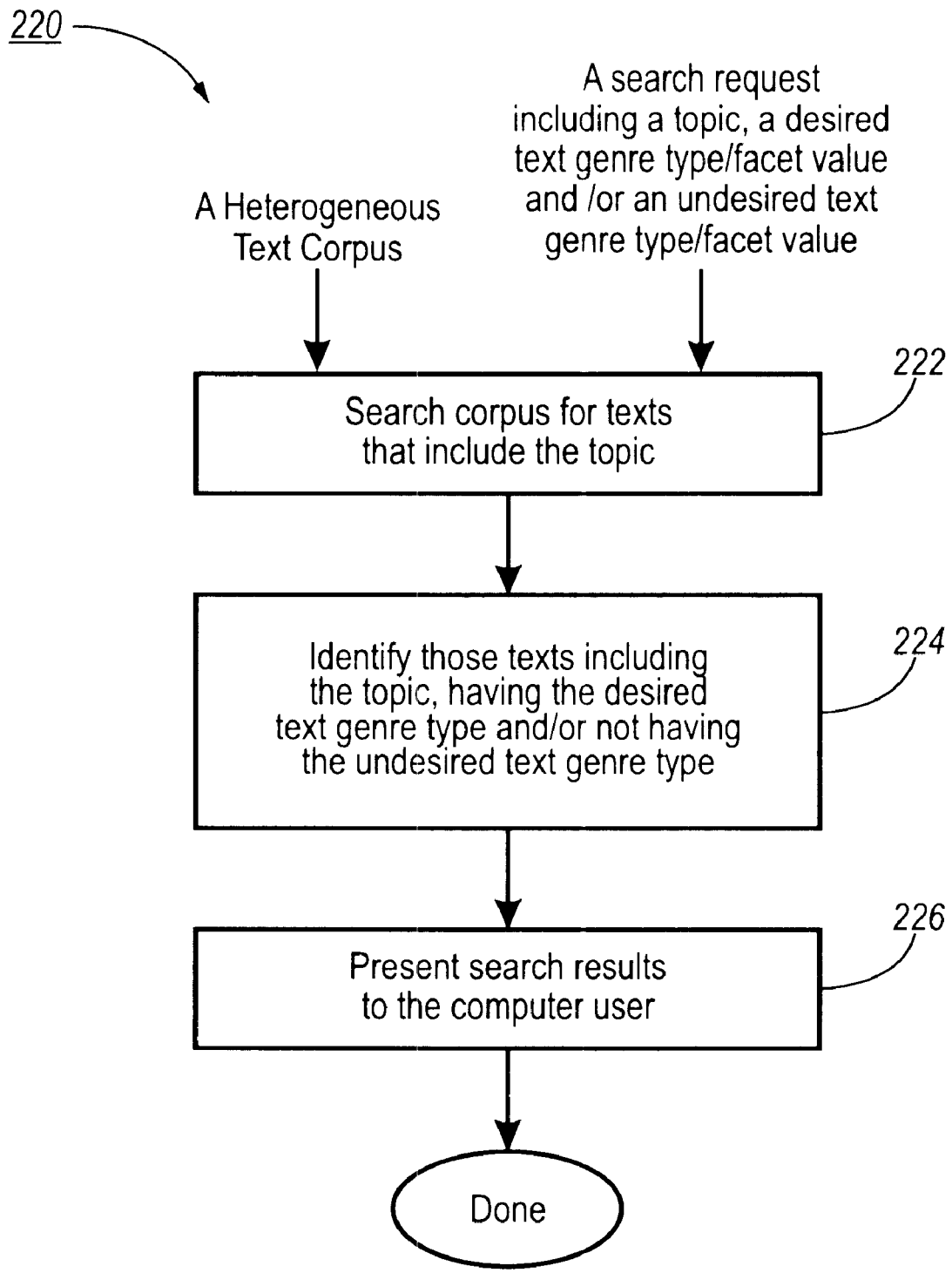
FIG. 6 illustrates in flow diagram form instructions for filtering information retrieval results using text genre.

FIG. 6 illustrates in flow diagram form instructions 220 for filtering information retrieval results based upon text genre. As with instructions 100 and 200, instructions 220 are stored electronically in memory, either memory 28 or on a floppy disk within disk drive. Instructions 220 need not be discussed in detail herein given the previous discussion of determining text genre type using instructions 100.

Automatic genre classification will also have information retrieval applications relating to document format. A great many document databases now include information about the appearance of the electronic texts they contain. For example, mark-up languages are frequently used to specify the format of digital texts on the Internet. OCR of hardcopy documents also produces electronic documents including a great deal of format information. However, the meaning of format features can vary within a heterogeneous database according to genre. As an example, consider the alternating use of boldface and normal type within a text. Within a magazine article this format feature likely indicates an interview; within an encyclopedia this same feature denotes headings and subsequent text; within a manual this feature may be used to indicate information of greater or lesser importance; or still yet, within the magazine Wired this format feature is used to distinguish different articles. Using automatic text genre classification to determine the meaning of format features would be useful in a number of applications. Doing so enables users to constrain their searches to major fields or document domains, like headings, summaries, and titles. Analogously, determining the meaning of format features enables discriminating between document domains of greater and lesser importance during automatic document summarization, topic clustering and other information retrieval tasks. Determining the meaning of format features also enables the representation of digital documents in a new format. In a number of situations preservation of original format is impossible or undesirable. For example, a uniform format may be desired when generating a new document by combining several existing texts with different format styles.

In a similar vein, automatic genre classification is useful when determining how to format an unformatted ASCII text.

Automatic classification of text genre has a number of applications to automatic document summarization. First, some automatic summarizers use the relative position of a sentence within a paragraph as a feature in determining whether the sentence should be extracted. However, the significance of a particular sentence position varies according to genre. Sentences near the beginning of newspaper articles are more likely to be significant than those near the end. One assumes this is not the case for other genres like legal decisions and magazine stories. These correlations could be determined empirically using automatic genre classification. Second, genre classification allows tailoring of summaries according to the genre of the summarized text, which is desirable because what readers consider an adequate summary varies according to genre. Automatic summarizers frequently have difficulty determining where a text begins because of prefatory material, leading to a third application for automatic genre classification. Frequently, prefatory material associated with texts varies according to text genre.

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. A processor implemented method of searching a heterogeneous corpus of untagged machine-readable texts, each text of the corpus having a text genre and a topic, the corpus including at least a first text genre and a second text genre, the corpus including a multiplicity of topics, the processor implemented method comprising the steps of:
   a) searching the corpus for a first multiplicity of untagged texts that have a first topic;
   b) identifying a first set of texts of the first multiplicity of untagged texts that are instances of the first text genre;
   c) identifying a second set of texts of the first multiplicity of untagged texts that are instances of the second text genre;
   d) identifying the first multiplicity of untagged texts to a computer user in an order based upon at least a first type and a second type of text genre.

2. The method of claim 1 wherein step b) comprises the steps of:
   b1) for each text of the first multiplicity, generating a cue vector from the text, the cue vector representing occurrences in the text of a set of nonstructural, surface cues; and
   b2) for each text of the first multiplicity, determining whether the text is an instance of the first text genre using the cue vector and a weighting vector associated with the first text genre.

3. The method of claim 1 wherein step b) comprises the steps of:
   1) for each text of the first multiplicity, generating a cue vector from the text, the cue vector representing occurrences in the text of a set of nonstructural surface cues;
   2) for each text of the first multiplicity, determining a relevancy to the text of each facet of a set of facets using the cue vector and a weighting vector associated with the facet; and
   3) for each text of the first multiplicity, determining whether the text is an instance of the first text genre based upon the facets relevant to the text.

4. The method of claim 2 wherein the set of nonstructural, surface cues includes a punctuational cue.

5. The method of claim 4 wherein the set of cues further includes at least a one of a lexical cue, a string recognizable constructional cue, a formulae cue and a deviation cue.

6. The method of claim 3 wherein the set of nonstructural surface cues includes a punctuational cue.

7. The method of claim 6 wherein the set of nonstructural surface cues further includes at least a one of a lexical cue, a string recognizable constructional cue, a formulae cue and a deviation cue.

8. The method of claim 6 wherein the set of facets includes at least a one of a date facet, a narrative facet, a suasive facet, a fiction facet, a legal fact, a science and technical facet, and an author facet.

9. The method of claim 2 wherein the first text genre is a one of a press report genre, an Email genre, an editorial opinion genre, and a market analysis genre.

10. The method of claim 3 wherein the first text genre is a one of a press report genre, an Email genre, an editorial opinion genre, and a market analysis genre.

11. An article of manufacture comprising:
   a) a memory; and
   b) instructions stored in the memory for a method of searching a heterogeneous corpus of untagged machine-readable texts, each text of the corpus having a text genre and a topic, the corpus including at least a first text genre and a second text genre, the corpus including a multiplicity of topics, the method being implemented by a processor coupled to the memory, the method comprising the steps of:
      1) searching the corpus for a first multiplicity of texts that have a first topic;
      2) identifying a first set of texts of the first multiplicity of untagged texts that are instances of the first text genre;
      3) identifying the first set of texts to a computer user.

12. A processor implemented method of searching a heterogeneous corpus of untagged machine-readable texts, each text of the corpus having a text genre and a topic, the corpus including a first multiplicity of text genres and a second multiplicity of topics, the processor implemented method comprising the steps of:
   a) receiving from a computer user a search request for texts having a first topic and a first text genre, the search request also identifying a second text genre to be excluded;
   b) identifying a third multiplicity of untagged texts of the corpus having the first topic;
   c) determining a text genre of each text of the third multiplicity of untagged texts; and
   d) identifying to the computer user those texts of the third multiplicity that are instances of the first text genre and not identifying any text of the third multiplicity that are instances of the second text genre.

13. An article of manufacture comprising:
   a) a memory; and
   b) instructions stored in the memory for a method of searching a heterogeneous corpus of untagged machine-readable texts, each text of the corpus having a text genre and a topic, the corpus including a first multiplicity of text genres and a second multiplicity of topics, the method being implemented by a processor coupled to the memory, the method comprising the steps of:

1) receiving from a computer user a search request for texts having a first topic and a first text genre, the search request also identifying a second text genre to be excluded;
2) identifying a third multiplicity of untagged texts of the corpus having the first topic;
3) determining a text genre of each text of the third multiplicity of untagged texts; and
4) identifying to the computer user those texts of the third multiplicity of untagged texts that are instances of the first text genre and not identifying any text of the third multiplicity of untagged texts that are instances of the second text genre.

14. The article of claim 13, wherein the step b3) comprises the substeps of:
   A) for each text of the third multiplicity of untagged texts generating a cue vector from the text, the cue vector representing occurrences in the text of a first set of nonstructural, surface cues; and
   B) for each text o the third multiplicity of untagged texts identifying a text genre from a second set of text genres using the cue vector and a weighting vector associated with each text genre.

15. The article of claim 13 wherein step b3) comprises the substeps of:
   A) for each text of the third multiplicity of untagged texts generating a cue vector from the text, the cue vector representing occurrences in the text of a first set of nonstructural, surface cues;
   B) for each text of the third multiplicity of untagged texts determining a relevancy to the text of each face of a second set of facets using the cue vector and a weighting vector associated with each facet, and
   C) for each text of the third multiplicity of untagged texts identifying relevant text genres from a third set of text genres based upon the facets relevant to the text.

16. The article of claim 14 wherein the first set of cues includes at least a one of either a punctuational cue, a lexical cue, a string recognizable constructional cue, a formulae cue and a deviation cue.

17. The article of claim 15 wherein the second set of facets includes at least a one of either a date facet, a narrative facet, a suasive facet, a fiction facet, a legal fact, a science and technical facet, and an author facet.

18. The article of claim 13 wherein the third set of text genres includes at least a one of either a press report genre, an Email genre, an editorial opinion genre, and a market analysis genre.

19. An article of manufacture comprising:
a) a memory; and
b) instructions stored in the memory for a method of searching a heterogeneous corpus of untagged machine-readable texts, each text of the corpus having a text genre and a topic, the corpus including a first multiplicity of text genres and a second multiplicity of topics, the method being implemented by a processor coupled to the memory, the method comprising the steps of:
   1) receiving from a computer user a search request for texts having a first topic and a first text genre to be excluded;
   2) identifying a third multiplicity of untagged texts of the corpus having the first topic;
   3) determining a text genre of each text of the third multiplicity of untagged texts; and
   4) identifying to the computer user those texts of the third multiplicity of untagged texts that have a text genre other than the first text genre.

20. An article of manufacture comprising:
a) a memory; and
b) instructions stored in the memory for a method of searching a heterogeneous corpus of untagged machine-readable texts, each text of the corpus having a topic and a facet value for each facet of a first multiplicity of facets, the corpus including a second multiplicity of topics, the method being implemented by a processor coupled to the memory, the method comprising the steps of:
   1) receiving from a computer user a search request for texts having a first topic and a first value of a first facet of the first multiplicity of facets;
   2) identifying a third multiplicity of untagged texts of the corpus having the first topic;
   3) for each text of the third multiplicity of untagged texts determining for a value of the first facet; and
   4) identifying to the computer user those texts of the third multiplicity of untagged texts that have the first value of the first facet.

21. The article of claim 20 wherein the request of step b1) further includes requesting exclusion of texts having a second value of a second facet of the first multiplicity of facets.

22. The article of claim 20 wherein the first multiplicity of facets includes at least a one of a date facet, a narrative facet, a suasive facet, a fiction facet, a legal fact, a science and technical facet, and an author facet.

* * * * *